(12) United States Patent
Yu

(10) Patent No.: US 7,273,311 B2
(45) Date of Patent: Sep. 25, 2007

(54) LIGHT GUIDE PLATE AND BACKLIGHT MODULE USING THE SAME

(75) Inventor: Tai-Cherng Yu, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 67 days.

(21) Appl. No.: 11/209,109

(22) Filed: Aug. 22, 2005

(65) Prior Publication Data
US 2006/0044834 A1   Mar. 2, 2006

(30) Foreign Application Priority Data
Aug. 27, 2004   (TW) .............................. 93125719 A

(51) Int. Cl.
*F21V 7/04*   (2006.01)

(52) U.S. Cl. ....................... 362/620; 362/612; 362/626

(58) Field of Classification Search ................ 362/600, 362/601, 606, 608, 610, 612, 615, 617, 619, 362/620, 621, 623, 625, 626, 628
See application file for complete search history.

(56) References Cited

U.S. PATENT DOCUMENTS 6,669,350 B2 * 12/2003 Yamashita et al. .......... 362/612
6,837,588 B2 * 1/2005 Kunimochi et al. ........ 362/617
6,877,872 B2 * 4/2005 Suzuki et al. ............... 362/615
2004/0095769 A1 * 5/2004 Huang et al. ................ 362/339

FOREIGN PATENT DOCUMENTS

JP   2004-111384   4/2004

* cited by examiner

*Primary Examiner*—Y. My Quach-Lee
(74) *Attorney, Agent, or Firm*—Morris Manning & Martin LLP; Tim Tingkang Xia, Esq.

(57) ABSTRACT

A light guide plate (30) includes an emitting surface (32) having a plurality of V-shaped prisms (33) thereat, a bottom surface (34) opposite to the emitting surface, the bottom surface having a plurality of arc-shaped grooves (35) thereon, and a cutout portion at a corner between two adjacent sides of the light guide plate, the cutout portion defining a light incident surface (31). When light beams enter the light guide plate and are reflected by the arc-shaped grooves, the parallel V-shaped prisms significantly reduce or even eliminate further reflection of the reflected light back into the light guide plate. Most or all reflected light beams reaching the emitting surface transmits out from the light guide plate and are utilized. Therefore, the light guide plate and the backlight module can provide highly efficient utilization of light beams.

20 Claims, 6 Drawing Sheets

LIGHT GUIDE PLATE AND BACKLIGHT MODULE USING THE SAME

BACKGROUND

1. Field of the Invention

The present invention relates to a light guide plate and a backlight module using the same, and in particular to a light guide plate configured with prisms and grooves.

2. General Background

Because a liquid crystal display (LCD) device has the merits of being thin, light in weight, and drivable by a low voltage, it is extensively employed in various electronic devices.

A liquid crystal panel of an LCD device cannot itself emit light beams. Therefore a typical liquid crystal panel uses a backlight module to provide the needed illumination. The backlight module has a light source and a light guide plate. The light source emits the light beams to the light guide plate, which then transmits the light beams to illuminate the liquid crystal panel.

Referring to FIG. 10, a typical backlight module 10 is shown. The backlight module 10 includes a light guide plate 12 and a light source 13. The light guide plate 12 has a bottom surface 15 and an emitting surface 14. The light source 13 is arranged adjacent to a corner of the light guide plate 12. A plurality of parallel V-shaped grooves 16 are arranged at the bottom surface 15. The V-shaped grooves 16 are arc-shaped. The V-shaped grooves 16 all have a same width and a same height. Moreover, a density of the V-shaped grooves 16 is uniform along a direction away from the light source 13.

When light beams emitted by the light source 13 enter the light guide plate 12, the incident light is reflected at the V-shaped grooves 16. Part of the incident light is reflected in directions corresponding to a viewing angle, and transmits out from the emitting surface 14. Another part of the incident light is reflected in directions such that the reflected light is further reflected by the emitting surface 14. Such light beams reflected from the emitting surface 14 undergo further reflection within the light guide plate 12, and may be completely lost and wasted. Therefore, the light guide plate 12 may have low brightness and low utilization of light energy.

What is needed, therefore, is a light guide plate which can provide highly efficient utilization of light beams.

SUMMARY

In a preferred embodiment of the present invention, a light guide plate includes an emitting surface having a plurality of V-shaped prisms thereon, a bottom surface opposite to the emitting surface, the bottom surface having a plurality of arc-shaped grooves thereon, and a cutout portion at a corner between two adjacent sides of the light guide plate so as to define a light incident surface.

A backlight module of a preferred embodiment of the present invention includes a light sources, and the above-described light guide plate. The light sources positions adjacent to the incident surface of the light guide plate.

When light beams enter the light guide plate, the incident light beams are reflected by the arc-shaped grooves. The parallel V-shaped prisms formed on the emitting surface significantly reduce or even eliminate further reflection of the reflected light back into the light guide plate. Most or all reflected light beams reaching the emitting surface transmit out from the light guide plate and are utilized. Therefore, the light guide plate and the backlight module can provide highly efficient utilization of light beams.

Other advantages and novel features of embodiments of the present invention will become more apparent from the following detailed description when taken in conjunction with the accompanying drawings; in which:

DETAILED DESCRIPTION OF PREFERRED EMBODIMENTS

Figure 1:
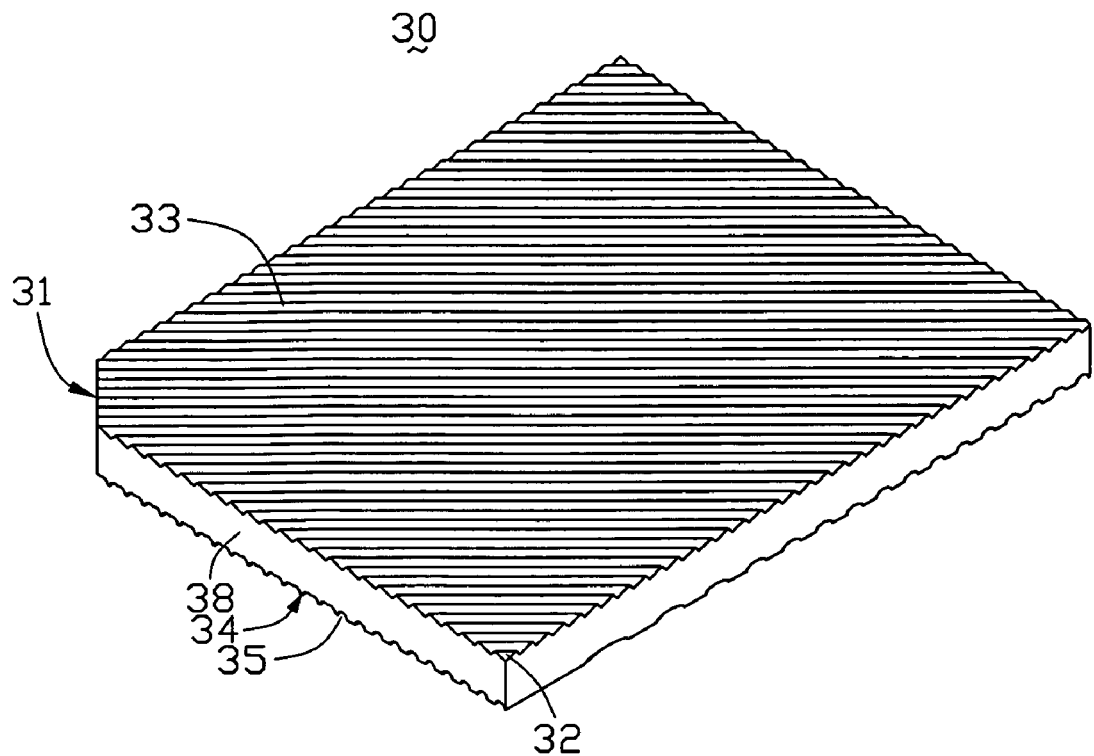
FIG. 1 is a schematic, top isometric view of a light guide plate of a first embodiment of the present invention.
Figure 2:
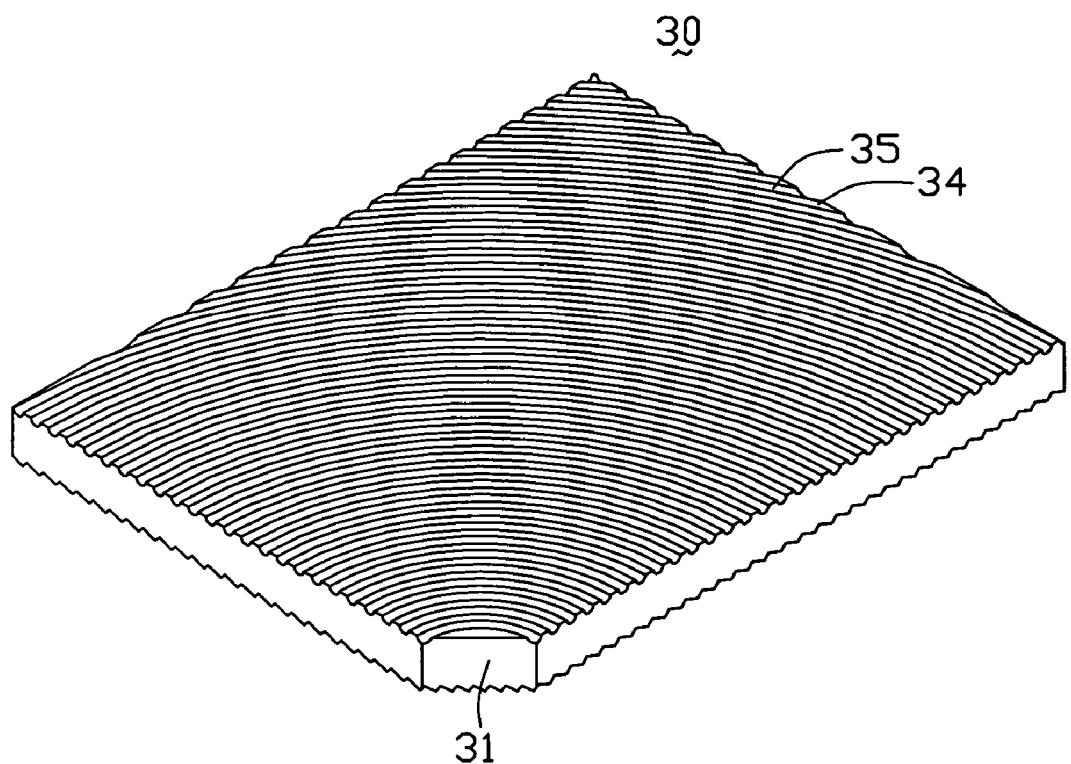
FIG. 2 is a schematic, bottom isometric view of the light guide plate of FIG. 1.

Referring to FIGS. 1 and 2, a plate-like light guide member 30 of a first embodiment of the present invention for a backlight module of a display device includes a cutout portion at a corner between two adjacent sides, a light incident surface 31 defined at the cutout portion, an emitting surface 32, and a bottom surface 34 opposite to the emitting surface 32.

A plurality of parallel protrusions, for example V-shaped prisms 33, are formed on the emitting surface 32, and a plurality of V-shaped grooves 35 are defined at the bottom surface 34. An angle between a lateral surface 38 and the incident surface 31 is obtuse, the obtuse angle being in the range from 125 to 135 degrees.

Figure 3:
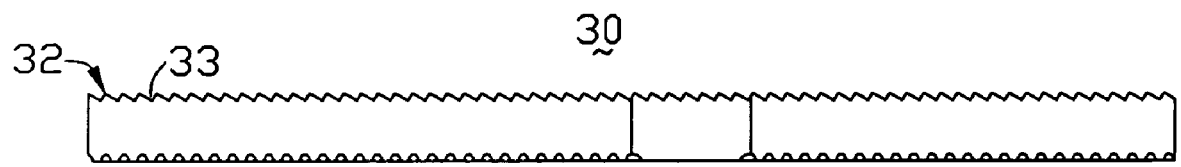
FIG. 3 is a side plan view of the light guide plate of FIG. 1.

FIG. 3 shows a schematic, side view of the light guide plate 30. A cross section of any of the parallel V-shaped prism 33 formed on the emitting surface 32 is a scalene triangle. A ratio of the two upper sides of the scalene triangle is 0.25, and the two upper sides of the scalene triangle maintain an angle in the range from 130 to 140 degrees.

Figure 4:
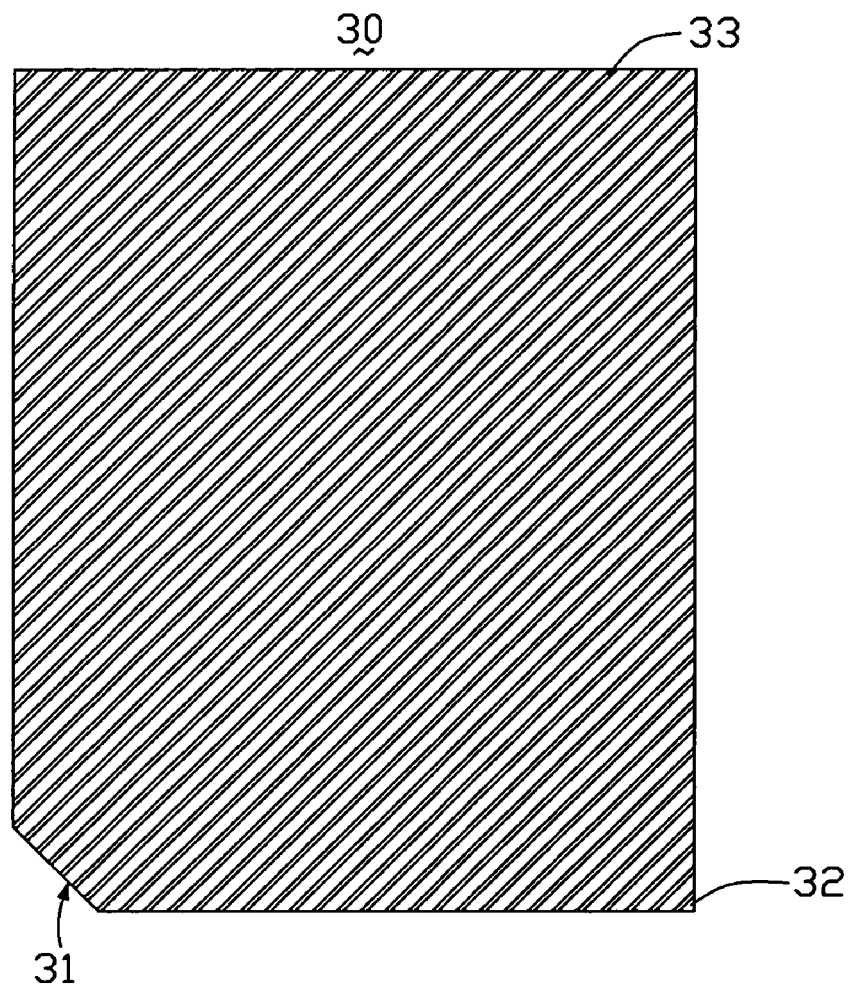
FIG. 4 is a top plan view of the light guide plate of FIG. 1.

FIG. 4 shows a top plan view of the light guide plate 30. The parallel V-shaped prisms 33 formed on the emitting surface 32 are perpendicular to the incident surface 31.

Figure 5:
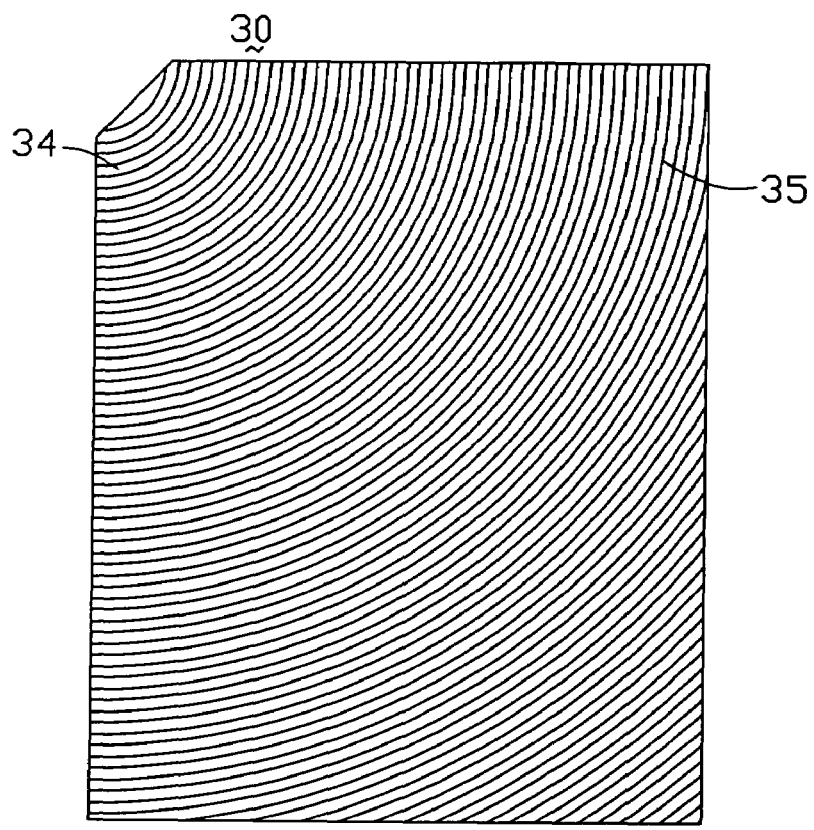
FIG. 5 is a bottom plan view of the light guide plate of FIG. 1.

FIG. 5 shows a bottom plan view of the light guide plate of FIG. 1. The V-shaped grooves 35 formed on the bottom surface 34 are arc-shaped, and are concentric relative to a reference point located outside the incident surface 31.

When light beams enter the light guide plate 30, the incident light is reflected by the arc-shaped grooves 35, and the parallel V-shaped prisms 33 formed on the emitting surface 32 redirect parts of the reflected light not corresponding to a viewing direction to light corresponding to the viewing direction. That is, the V-shaped prisms 33 significantly reduce or even eliminate further reflection of the reflected light back into the light guide plate 30. The parts of the reflected light not corresponding to the viewing direction are emitted from the emitting surface 32 and utilized. Therefore, the light guide plate 30 can provide highly efficient utilization of light beams.

Figure 6:
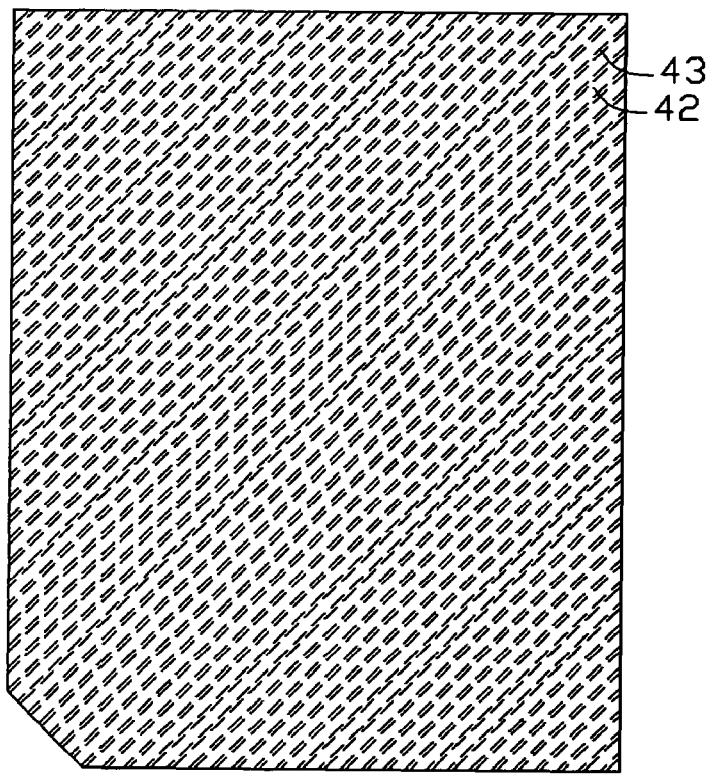
FIG. 6 is a top plan view of a light guide plate of a second embodiment of the present invention.
Figure 7:
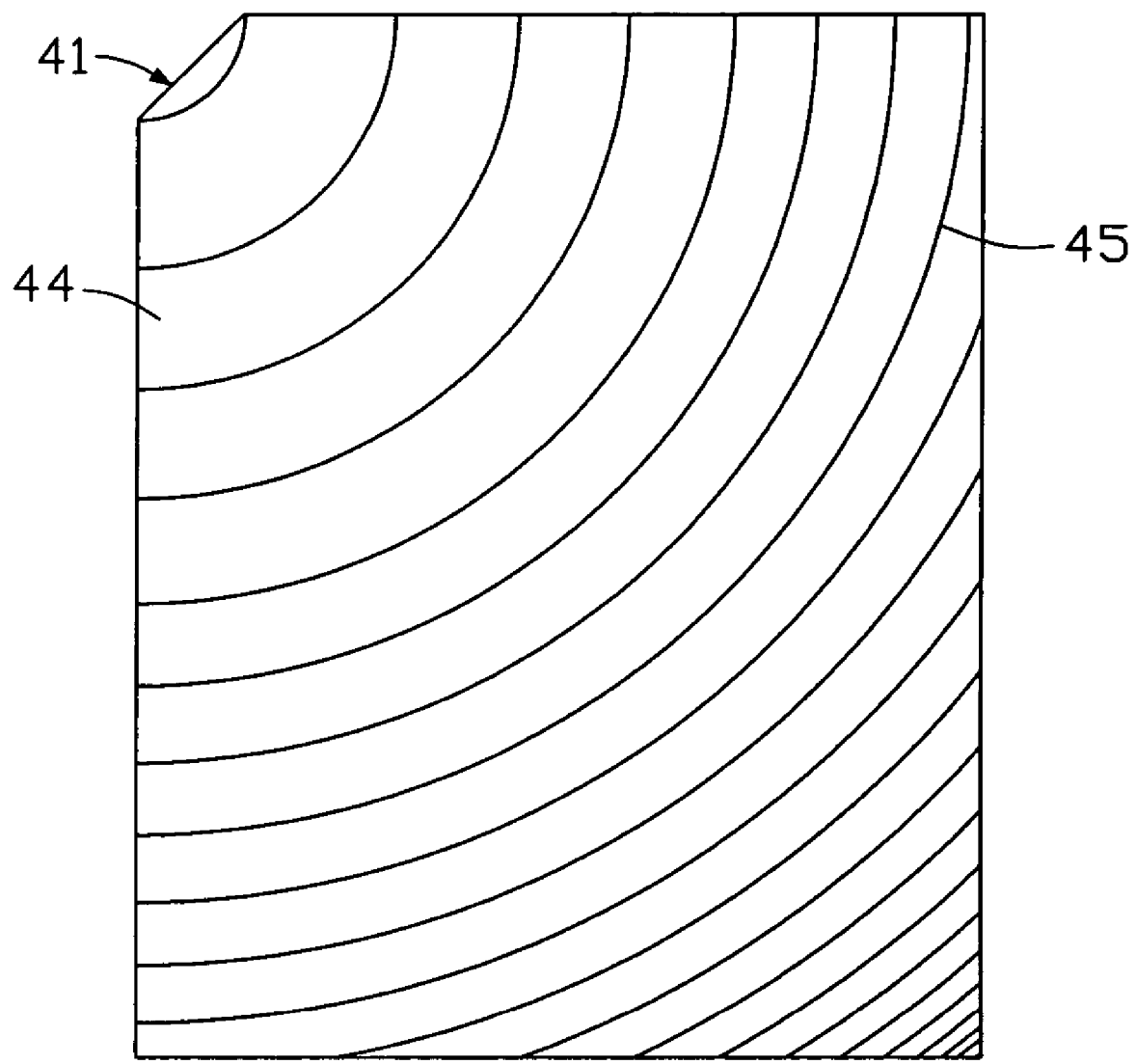
FIG. 7 is a bottom plan view of the light guide plate of FIG. 6.

Referring to FIGS. 6 and 7, a light guide plate 40 according to a second embodiment of the present invention is similar to the light guide plate 30 of the first embodiment. However, in the light guide plate 40, a plurality of parallel lines of V-shaped prisms 43 are formed on an emitting surface 42. The V-shaped prisms 43 are disposed at intervals along each line of V-shaped prisms 43. The lines of V-shaped prisms 43 are oriented perpendicular to an incident surface 41. A plurality of V-shaped grooves 45 is defined at a bottom surface 44. The V-shaped grooves 45 are arc-shaped, and are concentric relative to a reference point located outside the incident surface 41. A distance between adjacent V-shaped grooves 45 decreases along a direction away from the incident surface 41.

Figure 8:
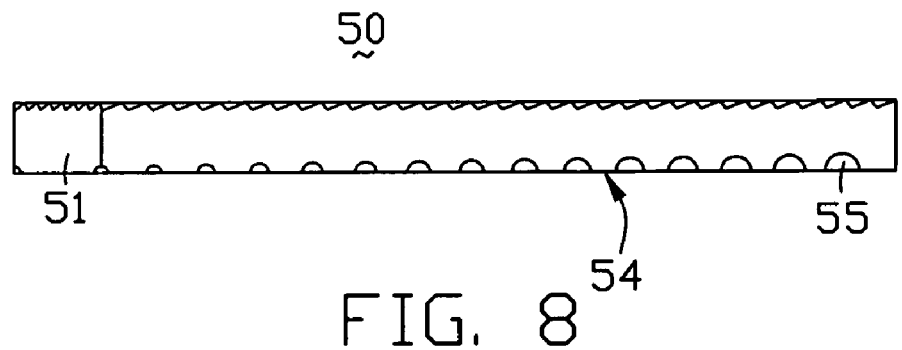
FIG. 8 is a schematic, side plan view of a light guide plate of a third embodiment of the present invention.

Referring to FIG. 8, a light guide plate 50 according to a third embodiment of the present invention is similar to the light guide plate 30 of the first embodiment. However, in the light guide plate 50, a plurality of U-shaped grooves 55 is defined at a bottom surface 54. The U-shaped grooves 55 are arc-shaped, and are concentric relative to a reference point located outside an incident surface 51. A height of the U-shaped grooves 55 increases along a direction away from the incident surface 51.

Figure 9:
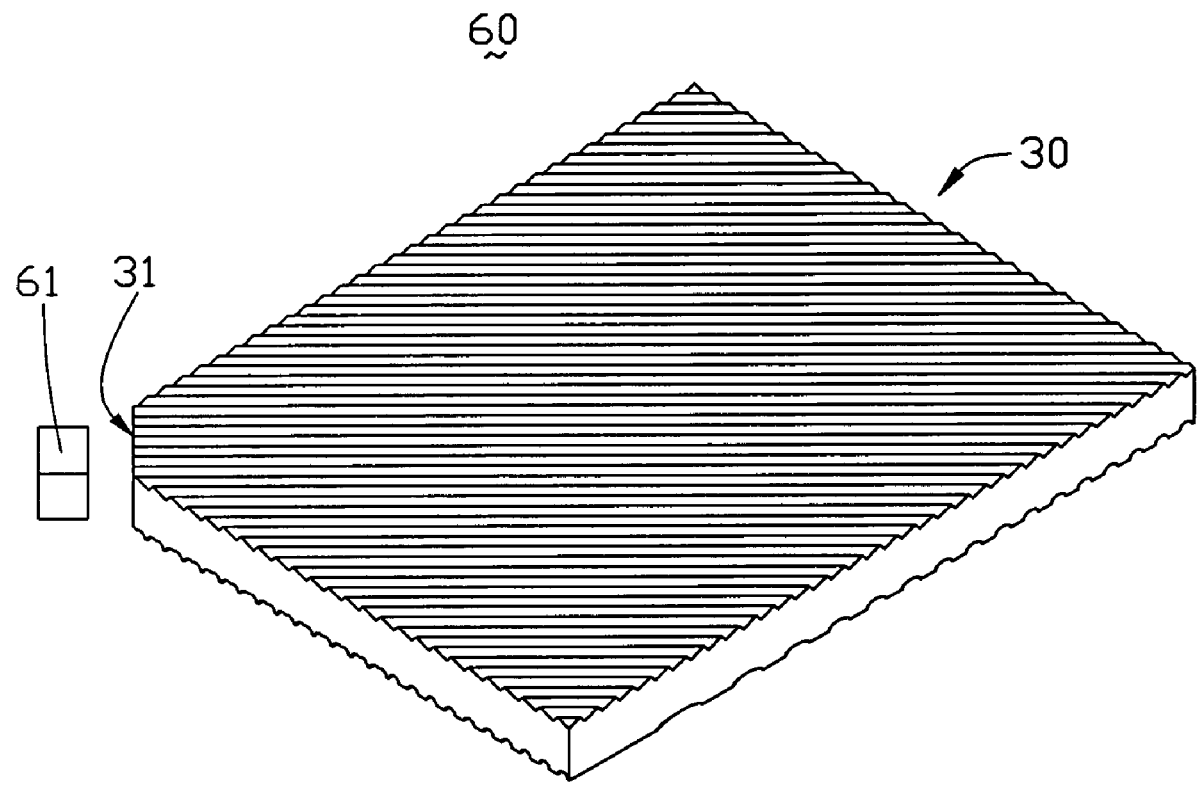
FIG. 9 is a schematic, isometric view of a backlight module of an embodiment of the present invention, the backlight module including the light guide plate of FIG. 1.
Figure 10:
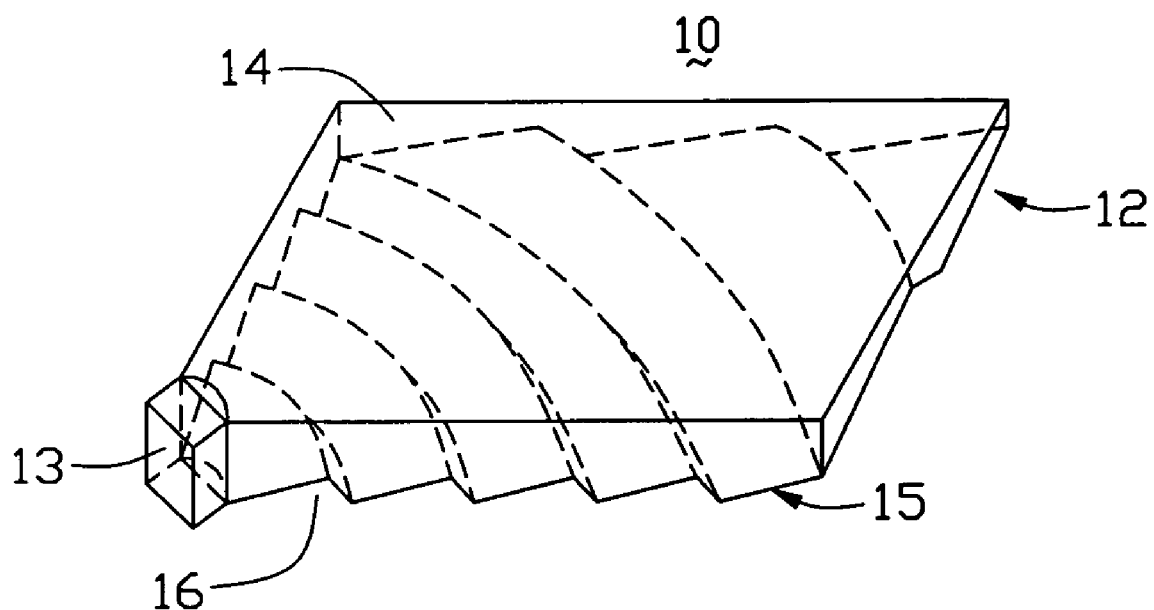
FIG. 10 is schematic, isometric view of a conventional backlight module including a light guide plate.

Referring to FIG. 9, this shows a backlight module employing the light guide plate 30 of the first embodiment. A light source 61 is positioned adjacent to the incident surface 31 of the light guide plate 30, for emitting light beams used to illuminate an LCD device or the like.

In summary, when light beams enter the light guide plate, the incident light beams are reflected by the arc-shaped grooves. The parallel V-shaped prisms formed on the emitting surface significantly reduce or even eliminate further reflection of the reflected light back into the light guide plate. Most or all reflected light reaching the emitting surface transmits out from the light guide plate and is utilized. Therefore, the light guide plate and the backlight module can provide highly efficient utilization of light beams.

It is to be understood, however, that even though numerous characteristics and advantages of the present embodiments have been set forth in the foregoing description, together with details of the structures and functions of the embodiments, the disclosure is illustrative only, and changes may be made in detail to the full extent indicated by the broad general meaning of the terms in which the appended claims are expressed.

I claim:

1. A light guide plate, comprising:
   an emitting surface having a plurality of V-shaped prisms thereat, the V-shaped prisms being parallel to each other;
   a bottom surface opposite to the emitting surface, the bottom surface having a plurality of arc-shaped grooves thereat; and
   a cutout portion at a corner between two adjacent sides of the light guide plate, the cutout portion defining a light incident surface adjacent to both the emitting surface and the bottom surface.

2. The light guide plate as claimed in claim 1, wherein the V-shaped prisms are disposed at intervals along each line of V-shaped prisms, and the lines of V-shaped prisms are oriented perpendicular to the incident surface.

3. The light guide plate as claimed in claim 1, wherein the light incident surface is planar and each of the V-shaped prisms extends along a same direction substantially perpendicular to the incident surface.

4. The light guide plate as claimed in claim 3, wherein a cross section of each of the V-shaped prisms is a scalene triangle, and a ratio of lengths of two upper sides of the scalene triangle is 0.25.

5. The light guide plate as claimed in claim 4, wherein the two upper sides of the scalene triangle maintain an angle in the range from 130 to 140 degrees.

6. The light guide plate as claimed in claim 1, wherein the grooves are concentric arc-shaped, and are concentric relative to a reference point located outside the incident surface.

7. The light guide plate as claimed in claim 6, wherein a distance between two adjacent arc-shaped grooves decreases along a direction away from the incident surface.

8. The light guide plate as claimed in claim 6, wherein a height of the arc-shaped grooves increases along a direction away from the incident surface.

9. The light guide plate as claimed in claim 1, wherein an angle between the light incident surface and each of the adjacent sides of the light guide plate is in the range from 125 to 135 degrees.

10. A backlight module, comprising:
    a light guide plate comprising an emitting surface having a plurality of V-shaped prisms thereon, a bottom surface opposite to the emitting surface having a plurality of arc-shaped grooves thereat, and a cutout portion disposed at a corner between two adjacent sides of the light guide plate, the cutout portion defining a light incident surface adjacent to both the emitting surface and the bottom surface, the V-shaped prisms being parallel to each other; and
    a light source positioned adjacent to the light incident surface of the light guide plate.

11. The backlight module as claimed in claim 10, wherein the V-shaped prisms are arranged in parallel lines, the lines of V-shaped prisms are oriented perpendicular to the incident surface, and the V-shaped prisms are aligned end-to-end in each line of V-shaped prisms, with an interval between each two adjacent V-shaped prisms in the line of V-shaped prisms.

12. The backlight module as claimed in claim 10, wherein the light incident surface is planar, and each of the V-shaped prisms extends along a same direction substantially perpendicular to the incident surface.

13. The backlight module as claimed in claim 12, wherein a cross section of each of the V-shaped prisms is a scalene triangle, and a ratio of lengths of two upper sides of the scalene triangle is 0.25.

14. The backlight module as claimed in claim 13, wherein the two upper sides of the scalene triangle maintain an angle in the range from 130 to 140 degrees.

15. The backlight module as claimed in claim 10, wherein the grooves are concentric arc-shaped, and are concentric relative to a reference point located outside the incident surface.

16. The backlight module as claimed in claim 15, wherein a distance between two adjacent arc-shaped grooves decreases along a direction away from the incident surface.

17. The backlight module as claimed in claim 15, wherein a height of the arc-shaped grooves increases along a direction away from the incident surface.

18. The backlight module as claimed in claim 10, wherein an angle between the light incident surface and each of the adjacent sides of the light guide plate is in the range from 125 to 135 degrees.

19. A display device comprising:
- a light source capable of providing light for said display device; and
- a light guide member disposed next to said light source, and comprising a light incident surface facing said light source to accept said light from said light source, an emitting surface for emitting said light out of said light guide member, and another surface of said light guide member interferingly defined in a traveling path of said light in said light guide member so as to reflect said light toward said emitting surface, a plurality of linear protrusions formed on said emitting surface and arranged parallel to one another, and a plurality of concentric curved grooves formed on said another surface and arranged parallel to one another.

20. The display device as claimed in claim 19, wherein said plurality of linear protrusions is a plurality of V-shaped prisms each of which extends along a direction substantially perpendicular to said light incident surface, and said plurality of concentric curved grooves are concentric relative to a reference point located outside said light incident surface.

* * * * *